Patented Feb. 5, 1946

2,394,517

UNITED STATES PATENT OFFICE 2,394,517

COOLING MEANS FOR DYNAMOELECTRIC MACHINES

Ross D. Ingalls, Scotch Plains, N. J., assignor to The Singer Manufacturing Company, Elizabeth, N. J., a corporation of New Jersey Application February 16, 1943, Serial No. 476,045

6 Claims. (Cl. 230—117)

This invention relates to the cooling of dynamoelectric machines and more particularly to the cooling of that type of dynamoelectric machine which is designed to be embodied in a duct of a ventilating system and to carry and drive the air-propelling fan which effects the flow of air through said duct.

It is common practice in the art of ventilation, to support an electric motor coaxially within a ventilating duct, to secure an air-propelling fan on the motor shaft and to provide, behind the fan in the direction of the flow of the airstream, stationary blades or vanes, in the nature of airfoils, to straighten out the airstream and to remove therefrom turbulence and eddy currents, thereby to increase the air flow efficiency of the system.

It is also common practice to use airfoils as spacing elements between the motor housing and the inner wall of the duct to support the motor housing and maintain it centrally within the duct.

Inasmuch as the motor is located within the airstream it is desirable to employ a totally closed casing for the motor so as to prevent the accumulation within the motor casing of foreign matter carried by the air which might otherwise promote early mechanical or electrical failure.

Unfortunately, with totally enclosed motors, it is difficult to extract the heat from the interior parts thereof and, as a result, such a motor of a given horsepower rating requires a larger frame size than the corresponding open frame motor in order to keep the temperature rise within allowable limits. Where, as in the present case, the motor is located within the duct itself, it is of particular importance that the motor frame size for a given horsepower rating be a minimum in order to secure as much fan driving power with as little air flow resistance as possible.

This invention has as a principal object, therefore, to provide improved means for cooling the interior parts including the air within a closed motor housing, whereby increased useful power output may be obtained for a given frame size.

A further object of the invention is to provide improved means for cooling a totally enclosed fan-driving motor mounted within an air duct and, at the same time increase the air flow efficiency within the duct.

With the above and other objects in view as will hereinafter appear, the invention comprises the combination and arrangement of parts hereinafter set forth and illustrated in the accompanying drawings of a specific embodiment of the invention from which the several features of the invention and the advantages attained thereby will be readily understood by those skilled in the art.

In the accompanying drawings—

Figure 1:
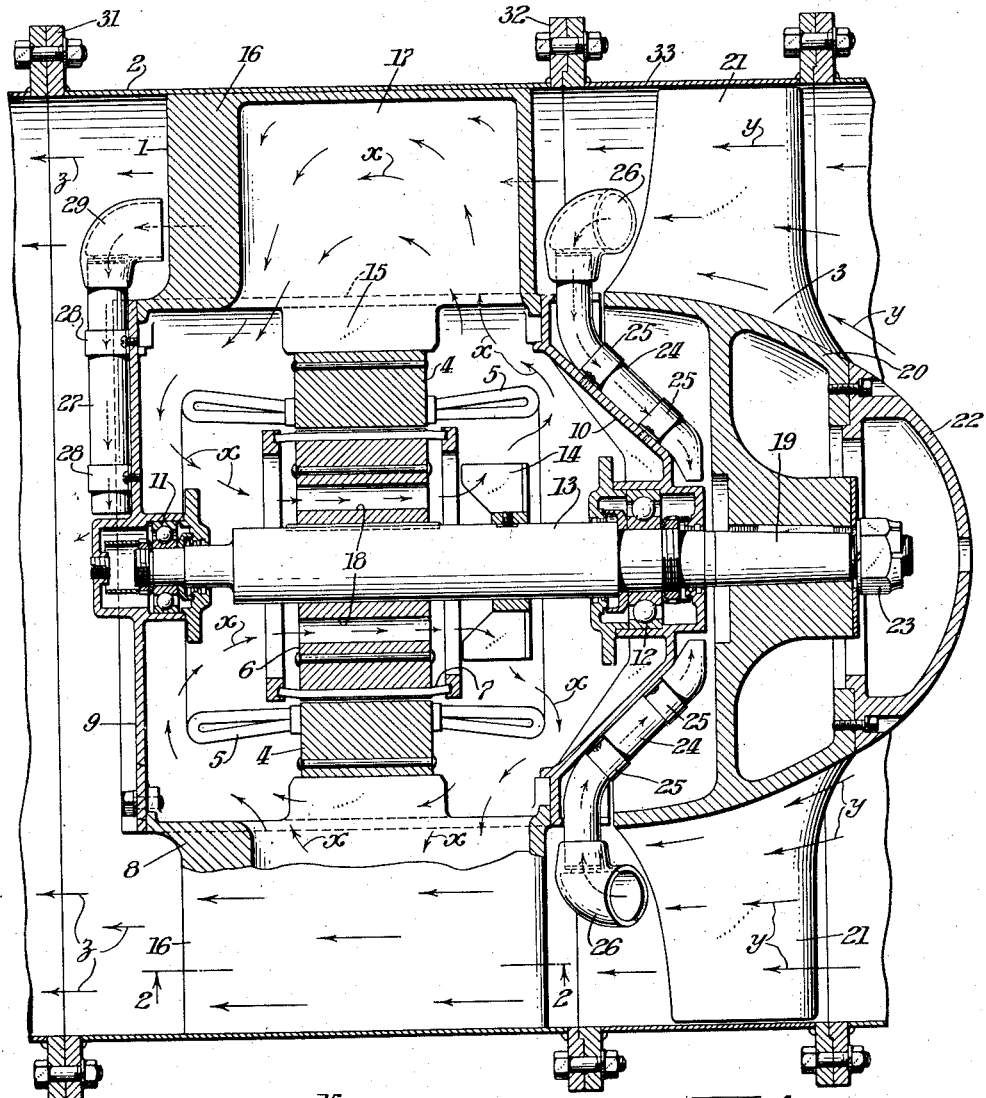
Fig. 1 is a longitudinal sectional view, partly in elevation, of an electric motor driving a propeller type fan within an air duct, and embodying the invention.

Referring more particularly to Fig. 1, the assembly shown therein comprises essentially a totally enclosed motor 1, mounted within a duct section 2 and driving a propeller type fan 3 for producing an axial flow of air under pressure through said duct. The motor comprises the usual stator core 4 to which is applied a current-carrying winding 5, and, a cooperating rotor core 6 carrying the usual squirrel-cage winding 7. A stator frame 8 closed at the ends with removable covers 9 and 10 provides a totally closed housing for the motor. The covers 9 and 10 are provided with bearings 11 and 12 held within bearing-receiving cavities in said respective covers. The rotor core 6 is keyed to a stepped shaft 13 which is carried by said bearings 11 and 12 to provide rotation for said rotor core concentrically within said stator core opening. A centrifugal fan 14 is secured to the shaft 13 at a point adjacent one end of the rotor core and provides re-circulation of the air within the totally enclosed motor casing continuously while the motor is running. The path taken by this circulating air is particularly influenced by the peculiar construction of the stator frame 8 which will now be described.

Figure 2:
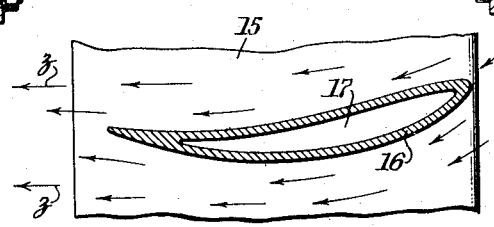
Fig. 2 is a sectional view taken on the line 2—2 of Fig. 1 to more clearly show the air foil shape.
Figure 3:
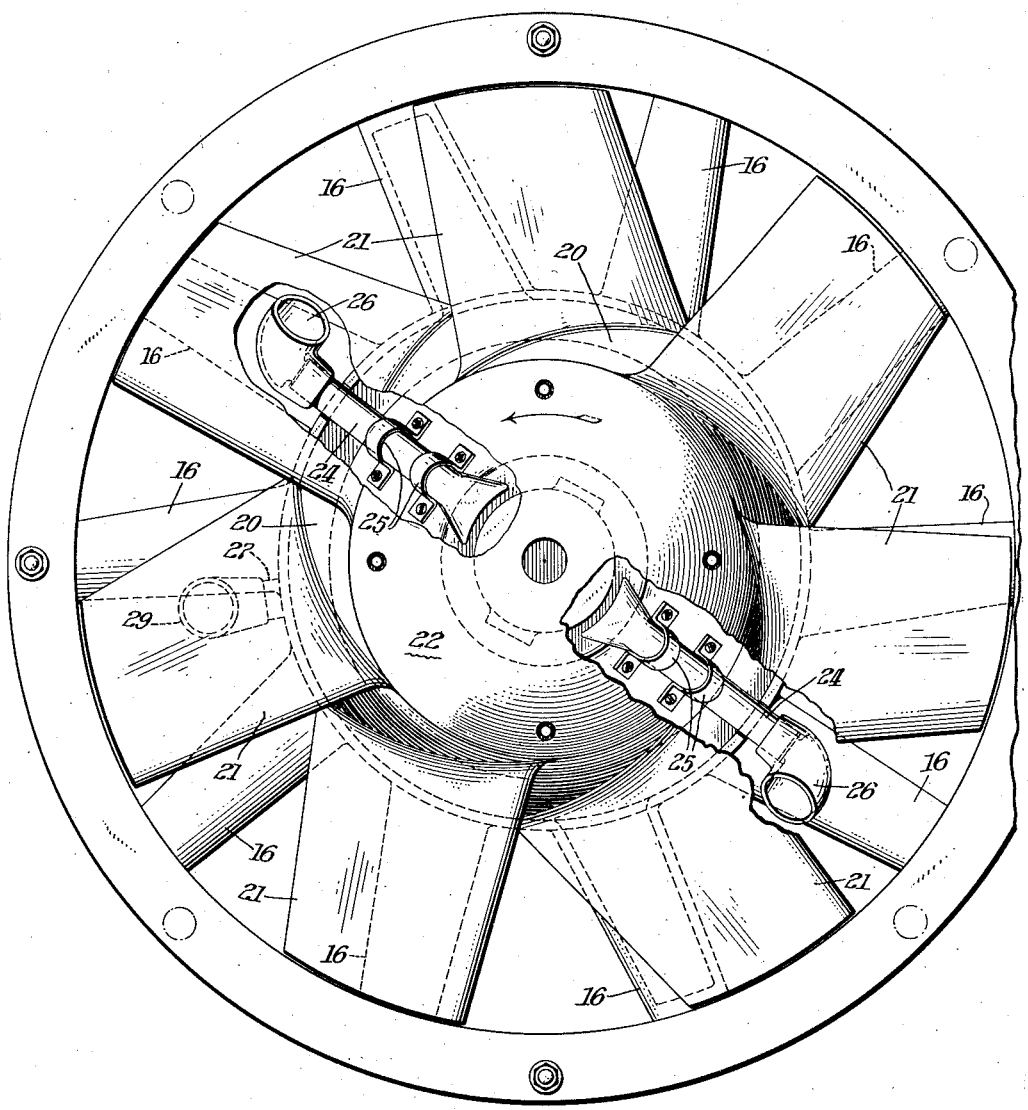
Fig. 3 is an end elevational view taken from the fan end.

The stator frame 8 is preferably formed in one piece and comprises an annular body portion 15 which supports the stator core 4 and to which is joined at equally-spaced intervals around the periphery thereof substantially radial blades or vanes 16 projecting into the airstream, each vane having an airfoil section, a typical portion of which is shown in Fig. 2. The stator core 4 is preferably held within the hub portion 15 of the stator frame by means of a tight press fit therewith and provides a path of sufficiently good heat conductance from the stator core to the airstream in the duct to contribute adequately to the cooling of the stator elements. The airfoil sections are hollow and present radial cavities 17 of considerable surface area, which cavities open inwardly to communicate with the interior of the motor enclosure and effectively increase the quantity of air within the motor housing as well as the area of the heat-dissipating surface with which this air is brought into contact. Outwardly, the vanes 16 present guiding surfaces to the airstream, to straighten out the spin imparted thereto, in a manner well known in the art.

The centrifugal fan 14 causes the air within the housing to circulate substantially as indicated by the arrows $x$ in Fig. 1. The air is pulled axially through the openings 18 in the rotor core toward the fan whence it is discharged radially and forced out around the end turns of the windings 5 and up into the cavities 17 of the fins 16 and thence radially inwardly to complete the circuit back to the openings 18. In this way, the interior air is brought continuously into intimate contact with the inner surfaces of the hollow airfoils 16 and serves as a conveyor of heat from the interior parts of the motor to the exterior airfoils where, after being conducted through the relatively thin walls thereof, said heat is dissipated into the air stream in the duct.

The motor shaft 13 is formed with an extended portion 19 to which is removably secured a hub 20 formed with generally radial blades 21 and comprising the fan 3. A nose-piece 22 is removably secured to the hub 20 to form therewith a streamlined spinner which increases the air flow efficiency of the fan by decreasing the eddying and turbulence and directing the air in a smooth stream against the blades 21 of the fan 3 as shown by the arrows $y$ in Fig. 1. The removable nosepiece 22 also permits ready access to the interior of the hub 20 and to the end of the shaft extension 19 whereby to facilitate assembly of the fan 3 on the shaft 13 by manipulation, for example, of the nut 23.

As is well known, the air issuing from the downstream side of the fan 3 will have a circumferential component of velocity due to the whirl imparted thereto by the fan. This component contributes nothing to the useful flow of air in the duct and is substantially eliminated by the straightener vanes 16 so that the air issuing from the downstream side of said vanes has substantially an axial flow as indicated by the arrows $z$ in Fig. 2.

Ducts 24, secured to the end cover 10 by means of straps 25, are provided at their outer ends with funnels 26 faced into the airstream in the direction of the maximum velocity to direct a stream of cooling air against the end cover at points adjacent the bearing 12.

Similarly, at the opposite end of the motor, a duct 27 is secured to the end cover 9 by means of straps 28 and is provided with a funnel 29 faced into the airstream to direct a stream of cooling air against the end cover 9 at a point adjacent the bearing 11.

The straightener vanes 16 may be secured by welds, bolts, or any suitable means to the duct section 2 which is provided with flanges 31 and 32 to facilitate installation in a duct system. A separate flanged duct section 33, extending axially over the fan, is provided, the removal of which permits direct access to the fan for repairs thereon or replacement thereof.

It will be understood that with two airstreams, each in intimate contact with and moving at considerable velocity on opposite sides of a relatively thin separating wall of sufficient heat conductance, the conditions are most favorable for effective heat transfer between the two airstreams, and this is the mechanism employed in the present invention to transfer the heat from the motor interior to the external airstream in the duct.

The scope of this invention is not limited to motors but includes application to air-driven generators which may be installed within ducts.

From the foregoing it will be perceived that I have provided improved means for cooling a totally enclosed dynamoelectric machine mounted in an airstream within a duct, including straightener vanes having internal cavities communicating with the interior of the machine housing for assisting in the transfer of heat from the machine interior to the airstream.

It will be obvious to those skilled in the art that the invention may, without departure from its essential attributes, be embodied in various specific forms other than those shown and described, which latter are to be considered in all respects as illustrative of the invention and not restrictive, reference being had to the appended claims rather than to the foregoing description to indicate the scope of the invention.

Having thus set forth the nature of the invention what I claim herein is:

1. An air flow unit comprising a duct, a dynamoelectric machine disposed within the duct, a fan external of and driven by said dynamoelectric machine for producing an airstream through said duct, a closed stator frame having an annular body portion for supporting said machine and formed integrally with hollow, imperforate straightener vanes projecting outwardly into said airstream and presenting interiorly a plurality of cavities opening inwardly to communicate with the interior of said dynamoelectric machine, and a fan mounted within said machine to circulate air between the interior of said machine and said cavities whereby heat may be transferred from the interior of the dynamoelectric machine to the airstream.

2. An air flow unit comprising a duct, a dynamoelectric machine disposed within the duct, a fan external of and driven by said dynamoelectric machine for producing an airstream through said duct, a closed stator frame having an annular body portion joined at substantially equi-distant points on the periphery thereof by hollow vanes projecting exteriorly into said airstream and presenting interiorly a plurality of cavities opening inwardly to communicate with the interior of said dynamoelectric machine, and a fan mounted therewithin and driven thereby to circulate air throughout the interior of said machine and said cavities whereby heat may be continuously transferred from the interior of the dynamoelectric machine to the airstream while said machine is in operation.

3. An air flow unit comprising a duct, a dynamoelectric machine disposed within the duct, a fan external of and driven by said dynamoelectric machine for producing an airstream through said duct, a closed stator frame having an annular body portion formed with hollow airfoils projecting outwardly and providing exteriorly a series of flow straightening surfaces and interiorly a plurality of cavities communicating with the interior of said dynamoelectric machine, and a fan mounted within said machine to circulate air between the interior of said machine and said cavities whereby heat may be transferred from the interior of the dynamoelectric machine to the airstream.

4. In a dynamoelectric machine adapted to be immersed in an airstream; a closed housing for said machine comprising a stator frame and cooperating end covers, said stator frame having an annular body portion formed with hollow vanes projecting into said airstream and presenting a plurality of cavities opening inwardly to communicate with the closed housing, bearings supported by said end covers and means for directing a portion of said airstream against said end covers adjacent the bearings.

5. An air flow unit comprising a duct, an electric motor disposed within the duct, a fan external of and driven by said motor for producing an airstream through said duct, a stator frame member formed with a closed body portion, which embraces the stator core of said electric motor, and with hollow airfoils projecting outwardly into the airstream from said body portion and secured to said duct, whereby to support said motor within the duct, said airfoils having cavities opening inwardly in communication with the interior of said motor, and a fan within said body portion for circulating air through said body portion and airfoils whereby heat is transferred from the interior of the electric motor to the airstream.

6. An air flow unit comprising a duct, an electric motor having a closed housing disposed within the duct, a fan external of and driven by said motor for producing an airstream through said duct, a stator frame member having a body portion, which embraces the stator core of said electric motor, a rotor within said stator having air passages extending lengthwise therethrough, hollow vane portions projecting outwardly into the airstream from said body portion and secured at their radial extremities to said duct whereby to support said motor within the duct, said hollow vanes having cavities opening inwardly in communication with the interior of said motor, and a fan within said housing for drawing air through the passages in said rotor and circulating it through said housing and hollow vanes and back to the rotor, thereby to dissipate the heat from the motor into the airstream.

ROSS D. INGALLS.